(12) United States Patent
Miyaoka

(10) Patent No.: US 6,314,061 B1
(45) Date of Patent: Nov. 6, 2001

(54) LINEAR HIGH DENSITY MAGNETO-OPTICAL RECORDING APPARATUS

(75) Inventor: Yasuyuki Miyaoka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/428,487

(22) Filed: Oct. 28, 1999

(30) Foreign Application Priority Data

Oct. 30, 1998 (JP) ................................................. 10-310828
Aug. 2, 1999 (JP) ................................................. 11-218906

(51) Int. Cl.[7] .............................................................. G11B 11/00
(52) U.S. Cl. .............................................................. 369/13
(58) Field of Search ........................... 369/13, 14, 116, 369/110, 59; 360/59, 114

(56) References Cited

U.S. PATENT DOCUMENTS

| 5,077,714 | * | 12/1991 | Katayama et al. ...................... 369/13 |
| 5,091,897 | | 2/1992 | Otokawa et al. . | |
| 5,200,935 | * | 4/1993 | Watanabe et al. ...................... 369/13 |
| 5,233,578 | | 8/1993 | Yamamoto et al. . | |
| 5,363,352 | * | 11/1994 | Tobita et al. ............................ 369/13 |
| 5,457,666 | * | 10/1995 | Toda et al. .............................. 369/13 |
| 5,485,433 | * | 1/1996 | Satomura et al. ...................... 369/13 |
| 5,953,289 | | 9/1999 | Miyaoka . | |
| 6,058,077 | * | 5/2000 | Miyaoka ................................. 369/13 |
| 6,069,852 | * | 5/2000 | Miyaoka et al. ....................... 369/13 |

FOREIGN PATENT DOCUMENTS 08-007350    1/1996   (JP) .

* cited by examiner

Primary Examiner—Tan Dinh
(74) Attorney, Agent, or Firm—Fitzpatrick, Cella, Harper & Scinto

(57) ABSTRACT

A magneto-optical recording-reproducing process for reproducing a record mark by projecting a light beam onto a magneto-optical medium having a memory layer and a readout layer to form a heated region to transfer and enlarge in the heated region a magnetic domain in the memory layer into the readout layer comprises the steps of recording a record mark sequence in the memory layer with correction of the length of the record mark to be shorter than that of a normal interval of code reversal and with correction of the length of the no-record mark to be longer correspondingly thereto, where the magnetic domain in the direction of enlarging the magnetic domain in the readout layer is employed as the record mark, and further comprising reproducing the record mark sequence.

14 Claims, 6 Drawing Sheets

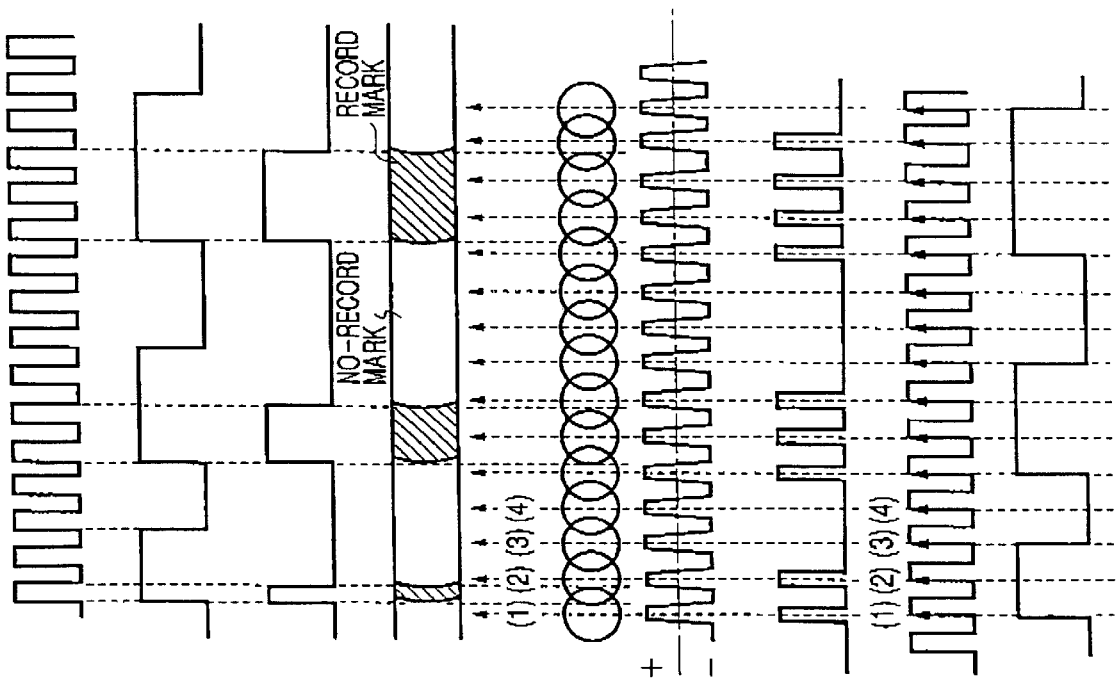

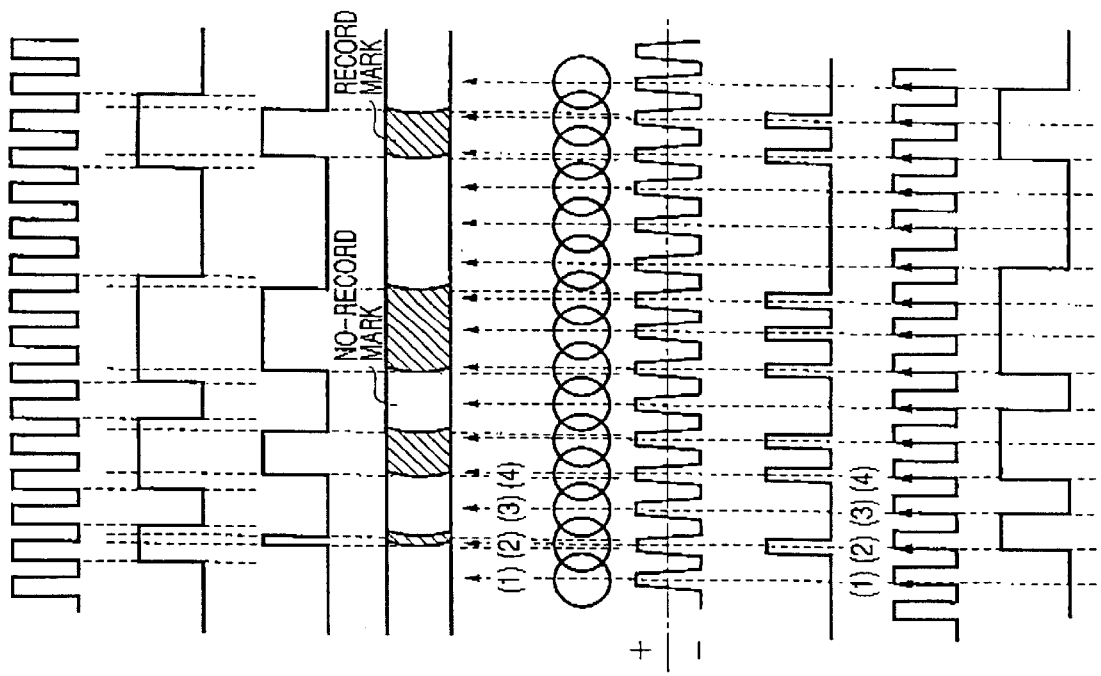

LINEAR HIGH DENSITY MAGNETO-OPTICAL RECORDING APPARATUS

BACKGROUND OF THE INVENTION

1. Filed on the Invention

The present invention relates to a method for magneto-optical recordation and reproduction, and an apparatus therefor.

2. Related Background Art

Magneto-optical mediums are known, as a reloadable high density recording system, which record information by writing magnetic domains on a magnetic thin film with thermal energy of a semiconductor laser and reading out the information by utilizing magneto-optical effect. In recent years, the magneto-optical medium is required to record information in a still higher recording density for larger recording capacity.

The linear recording density of an optical disk such as magneto-optical mediums depends largely on the laser wavelength and the numerical aperture NA of the objective lens of the optical reproduction system. The beam waist diameter depends on the laser beam wavelength and the numerical aperture NA of the objective lens of the optical regeneration system, so that the detectable spatial frequency for record mark reproduction is limited approximately to $2NA/\lambda$. Therefore, for higher density of the conventional optical disks, the laser wavelength of the reproducing optical system should be shorter and the NA of the objective lens should be larger. However, improvements in the laser wavelength and in the numerical aperture of the objective lens are naturally limited. For further improvement of the recording density, techniques are being developed to improve a constitution of the recording medium and the method of readout.

For example, Japanese Patent Application Laid-Open No. 8-7350, discloses a magneto-optical recording medium and a magneto-optical recording-reproducing apparatus that use a domain-enlarging reproduction system. In this reproduction system, a magneto-optical disk has an exchange-coupled three-layered magnetic film as the memory layer; magnetic domains in the memory layer are transferred to the readout layer which is heated with a light spot to lower the coercivity force thereof; the transferred domains are enlarged by application of a reproducing magnetic field; and the information is reproduced by utilizing disappearance of the transferred and amplified domain by application of a reversed reproducing magnetic field. The process disclosed in the above laid-open publication is said to improve greatly the signal-to-noise ratio (S/N) of the reproduced signals of fine domains to enable a higher recording density.

The constitution of the magneto-optical recording reproduction apparatus of the domain-enlarging reproduction system is explained below, with reference to FIG. 1 showing the constitution of the apparatus. In FIG. 1, magneto-optical disk 1 comprises a sample-servo substrate 2, a magneto-optical medium 3 coating the substrate, and a protection layer 4, where magneto-optical medium 3 is constituted of a memory layer and a readout layer. The apparatus has an objective lens 6 as the condenser lens, an actuator 5 for driving condenser lens 6 for focusing and tracking, a semiconductor laser 7 for projecting a light beam, a collimator lens 9 for collimating the light beam, a beam splitter 12 for separating the light beam, a $\lambda/2$ plate 14, a polarized beam splitter 15, photosensors 17 for photoelectric conversion, and condenser lenses 16 for photosensors 17.

Differential amplification circuit 18 amplifies differentially signals condensed and detected in the respective polarization directions of the light beam. Addition amplification circuit 19 adds and amplifies the signals condensed and detected in the respective polarization directions of the light beam. Magnetic head 26 applies, in recordation, a modulated magnetic field in accordance with signals to be recorded onto the laser-projected spot on magneto-optical disk 1, and applies, in reproduction, an alternating magnetic field of a prescribed frequency. The magnetic head is placed in opposition to condenser lens 6 with the magneto-optical disk 1 interposed therebetween.

The magneto-optical recordation-reproduction method of the aforementioned domain-enlarging reproduction system is explained below with reference to the timing charts shown in FIGS. 2A to 2H. Here, a method is explained for mark-edge recordation using a 1-7 code (RLL) as the memory modulation code.

FIG. 2A shows a channel clock for 1-7 modulation codes in recordation. FIG. 2B shows a sequence of 1-7 NRZI recording signals outputted from controller 24. FIG. 2C shows a sequence of record marks recorded by magnetic head 26. FIG. 2D shows heated regions at the clock timing. FIG. 2E shows application of the reproducing magnetic field controlled by controller 24. FIG. 2F shows reproduction signals corresponding to the record mark sequence shown in FIG. 2C.

FIG. 2G shows a reproduction clock signal. FIG. 2H shows reproduced binary signals corresponding to the record mark sequence shown in FIG. 2C.

The recordation is conducted as follows. Field modulation recordation is conducted by projecting a recording DC laser power in a pattern shown in FIG. 2B by LD driver 25 and semiconductor laser 7 onto a magneto-optical disk 1, corresponding to the channel clock shown in FIG. 2A, and applying a modulated magnetic field corresponding to the recordation signal by magnetic head driver 27 and driver 26. Thereby, a sequence of record marks shown in FIG. 2C are formed on the memory layer by changing the direction of the recording magnetization in accordance with the information. In FIG. 2C, the shadowed portions and the unshadowed portions show magnetic domains magnetized in directions reverse to each other.

The reproduction is conducted as follows. In the reproduction, a reproduction clock signal is formed in synchronization with the record pattern. The reproduction clock signal is formed in synchronization with the recording pattern, for example, by a sample-servo system by detecting synchronization signals of the record pattern from clock pits preliminarily formed on magneto-optical medium 1.

In the sample-servo system, the recordation is conducted also in synchronization with a clock signal formed by detection of the above clock pits. Therefore, by conducting the reproduction using the clock signal formed by detection of the clock pits, the recording and the reproduction can be synchronized with the clock signal.

Not only in the sample-servo system, a reproducing magnetic field can be applied in synchronization with the recorded domain sequence by conducting the recordation and reproduction by detecting the clock pits or the like formed preliminarily on the recording medium and conducting the recordation and the reproduction according to the clock signal.

In FIGS. 2A to 2H, the channel clock shown in FIG. 2A corresponds to the clock signal formed during recordation, and the signal shown in FIG. 2G corresponds to the clock signal for reproduction. In FIGS. 2A to 2H, the recordation phase and the reproduction phase are shifted by 180° from each other. The reproducing magnetic field is applied in synchronization with the reproduction clock shown in FIG. 2G at the timing shown in FIG. 2E.

FIG. 2D shows the sampling time for judgement of the level of the reproduction signal, namely the heated regions on the recording medium heated by light projection for reproduction at the clock timing. The reproduction light is not limited to DC light and pulse light, but may be any light which is capable of forming heated regions to cause transfer of recording magnetic domains onto the readout layer.

A reproducing magnetic field having the same frequency as the modulation code channel clock of FIG. 2A is applied to these heated regions. Thereby, a recorded domain, which is present in the heated region in the memory layer, is transferred to the readout layer and is enlarged instantaneously by application of the magnetic field in a domain-enlarging direction to cause a sharp change in the regeneration signal.

Conversely, by reversing the direction of the applied alternating magnetic field, the enlarged magnetic domain is erased instantaneously to cause a sharp change of the reproduction signal (time (1) and time (2)). When no record mark is present in the memory layer, no magnetic domain is transferred to the readout layer, and the application of an alternating magnetic field does not cause enlargement of the magnetic domain, giving no change of reproduction signal (time (3) and time (4)). As a result, a reproduction signal is obtained as shown in FIG. 2F.

The reproduction signal shown in FIG. 2F obtained from differential amplification circuit 18 is binarized into binary data, and the obtained binary data is input to a D-input such as D-flip-flop 23. A reproduction clock signal formed in clock-forming phase switching circuit 21 is input to a clock input terminal. Thereby, a reproduced binary signal output is obtained as shown in FIG. 2H. The recorded data shown in FIG. 2B is reproduced as the signal shown in FIG. 2H.

As described above, the magneto-optical recording reproducing process enables recordation and reproduction of information. Further, the above described recording medium and the reproduction process employing the recording medium are not restricted by the resolution of the optical system, enabling an increase in record density.

However, in the aforementioned conventional magneto-optical mediums and magneto-optical processes, any recorded domain, which is present in the region having a coercivity force lowered by laser beam spot heating in the memory layer, will be transferred to the readout layer, and the transferred domain will be enlarged by the reproducing alternating magnetic field. Generally, the resolution during reproduction depends on the size of the heated region having a coercivity force lowered by laser beam irradiation.

In FIGS. 3A to 3H, FIG. 3A shows a channel clock signal of 1-7 modulation codes for recordation. FIG. 3B shows a sequence of 1-7 NRZI recording signals. FIG. 3C shows a record mark sequence recorded by magnetic head 26. FIG. 3D shows heated regions at clock timings. FIG. 3E shows a reproducing magnetic field controlled by controller 24. FIG. 3F shows a reproduced signal corresponding to the record mark sequence of FIG. 3D. FIG. 3G shows a reproducing clock signal. FIG. 3H shows reproduced binary signals intended to correspond to the record mark sequence of FIG. 3B.

A case is considered in which it is intended to record and reproduce signals in higher linear recordation density as shown in FIGS. 3A to 3H, for example. When reproducing no-record marks at time (3) and time (4) of the reproduction clock signal, recorded domains exist in heated regions (3) and (4), and the recorded domains are transferred to the memory layer and enlarged by application of the reproducing magnetic field.

Consequently, the no-record mark is reproduced as a record mark, which causes reproduction error, and the signal is reproduced as shown in FIG. 3F, and a reproduced binary signal sequence is obtained as shown in FIG. 3H, which is different from the recording signal sequence shown in FIG. 3B.

Since the size of the heated region is controlled by output intensity of the reproduction power, a reproduction signal may be obtained by lowering the output intensity of the reproduction power when high linear density of record marks is used. However, when considering the stability of the heated region, the decrease of the reproduction power output intensity is limited for the size decrease of the heated region.

From the aforementioned phenomenon, in reproduction of a record mark sequence by mark edge recordation regarding FIG. 3B, the length of one cycle of the channel clock signal should be larger than that of the heated region in the scanning direction so as not to transfer the record mark from the memory layer to the readout layer. Therefore, if the heated region is 0.2 $\mu$m and the channel length is T, then T>0.2 $\mu$m. Therefore, the linear recordation density has an upper limit corresponding to the region of channel length T>0.2 $\mu$m. This is the recordation limit of the linear density in this type of recording medium and recording-reproducing process.

SUMMARY OF THE INVENTION

The present invention provides a magneto-optical recording-reproducing process which is less limited in linear recording density of the memory layer of the magneto-optical medium and capable of reproducing high density information, and an apparatus therefor.

According to an aspect of the present invention, there is provided a magneto-optical recording reproducing process for reproducing a record mark by projecting a light beam onto a magneto-optical medium having a memory layer and a readout layer to form a heated region to transfer and enlarge in the heated region a magnetic domain in the memory layer into the readout layer. The process comprises the steps of recording a record mark sequence in the memory layer with correction of the length of the record mark so as to be shorter than that of the standard interval of code reversal and with correction of the length of the no-record mark so as to be correspondingly longer. The magnetic domain in the direction of enlarging of the magnetic domain in the readout layer is employed for detecting the record mark and for reproducing the sequence of record marks.

According to another aspect of the present invention, there is provided a magneto-optical recording-reproducing apparatus having means for forming a heated region by projecting a light beam onto a magneto-optical medium having a memory layer and a readout layer, means for transferring a magnetic domain in the memory layer at the heated region into the readout layer and enlarging the transferred magnetic domain, and means for reproducing the record mark. The apparatus comprises correction means for correcting the length of the record mark so as to be shorter than that of the standard interval of code reversal and for correcting the length of the no-record mark so as to be correspondingly longer, where the magnetic domain in the direction of enlarging of the magnetic domain in the readout layer is employed for detecting a record mark sequence in the memory layer. Recordation means is provided for recording in the memory layer a record mark corrected by the correction means, and reproduction means is provided for reproducing the record mark sequence.

BRIEF DESCRIPTION OF THE DRAWINGS

FIGS. 5A, 5B, 5C, 5D, 5E, 5F, 5G, 5H and 5I are timing charts of the magneto-optical recording reproducing process of Embodiment 1 of the present invention.

FIGS. 6A, 6B, 6C, 6D, 6E, 6F, 6G, 6H, and 6I are timing charts of the magneto-optical recording reproducing process of Embodiment 2 of the present invention.

DESCRIPTION OF THE PREFERRED EMBODIMENT (Embodiment 1)

NRZI recordation with 1-7 modulation codes is explained in this embodiment, taking as an example a case where the minimum interval $n_{min}$ of code inversion of the recording codes is even in number. Incidentally, $n_{min}$ in the 1-7 modulation NRZI recording is 2.

Figure 4:
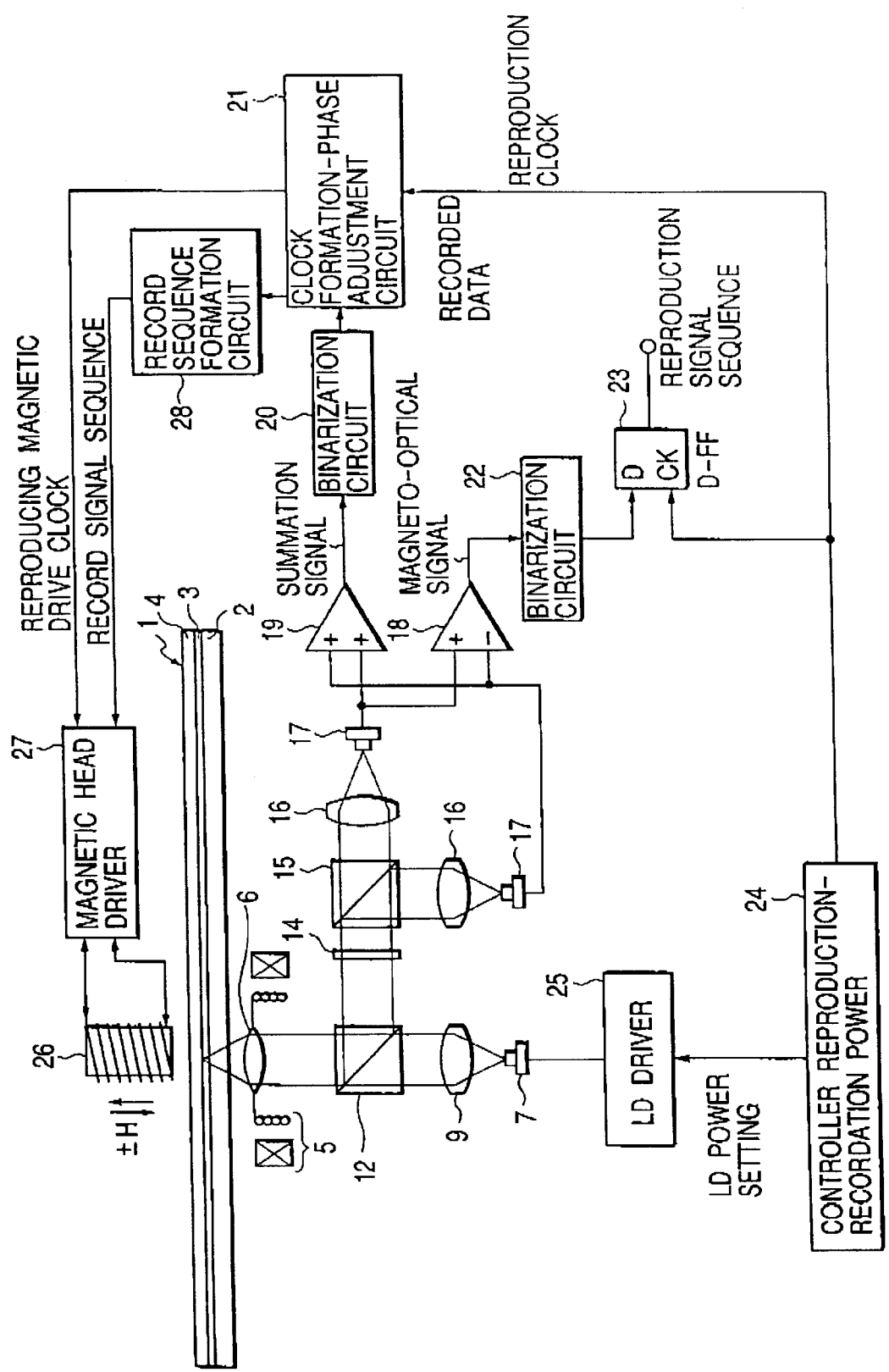
FIG. 4 illustrates schematically the magneto-optical recording-reproducing apparatus of Embodiment 1 of the present invention.

FIG. 4 illustrates the constitution of a magneto-optical recording-reproducing apparatus of this embodiment of the present invention. In FIG. 4, a magneto-optical disk 1 is constituted of a substrate 2 made of a glass or plastic, a magneto-optical medium 3 coating the substrate, and a protection layer 4. Magneto-optical medium 3 has a memory layer and a readout layer. To magneto-optical medium 3, a light beam is projected to form heated regions therein to transfer the magnetization in the heated regions in the memory layer to the readout layer, an alternating magnetic field is applied in synchronization with the record mark sequence to enlarge the magnetic domains transferred to the readout layer, the magnetic domains in the readout layer are erased by application of a magnetic field in a direction reverse to the magnetic domain enlargement direction of the alternating magnetic field, and the change of the polarization plane of reflection of the light beam is detected to reproduce the record marks.

In FIG. 4, magneto-optical disk 1 is supported rotatably by a spindle motor rotatably around a rotation axis by a magnetic chuck or like means. Parts 5-17 constitute an optical head for projecting a laser light beam to magneto-optical disk 1 and collecting information from the reflected light. Objective lens 6 serves as a condenser lens. Actuator 5 drives condenser lens 6 for focusing and tracking. Semiconductor laser 7 projects a light beam. Collimator lens 9 collinates the light beam. Beam splitter 12 splits the light beam. The numeral 14 indicates a $\lambda/2$ plate, 15 a polarized beam splitter, 17 a photosensor for photoelectric conversion, and 16 a condenser lens for photosensor 17.

Differential amplification circuit 18 amplifies differentially signals condensed and detected in the respective polarization directions of the light beam. Addition-amplification circuit 19 adds and amplifies signals condensed and detected in the respective polarization directions of the light beam. Binarizing circuit 22 binarizes the magneto-optical signals input from differential amplification circuit 18. Binarizing circuit 20 binarizes the summation signals input from addition-amplification circuit 19. Clock formation-phase adjustment circuit 21 forms a recordation clock signal and a reproduction clock signal from the signals binarized by binarization circuit 20 and adjusts the phase. D-flip-flop 23 receives signals binarized by binarization circuit 22 at the D input terminal and receives a reproduction clock signal formed by clock formation-phase adjustment circuit 21 at the CK input terminal to obtain a reproduction signal sequence.

Record sequence formation circuit 28 forms a record sequence of record signals, which is characteristic of the present invention. The formed record pattern is recorded into the memory layer of magneto-optical medium 3 by magnetic head driver 27 and magnetic head 26. Magnetic head 26 applies, on recordation, a modulated magnetic field to the laser-irradiated spot on the magneto-optical disk in accordance with the signals to be recorded, and applies, on reproduction, an alternating magnetic field of a prescribed frequency. This magnetic head 26 is placed in opposition to condenser lens 6 with the of magneto-optical disk interposed therebetween.

Controller 24 controls magnetic head driver 27 in accordance with the recordation signals and reproduction magnetic field control signals according to the revolution number, recording radius, recording sector information as the input information; and controls LD driver 25 according to recordation-LD power setting signals, etc. LD driver 25 drives semiconductor laser 7 so as to control the recordation power and reproduction power at the desired levels in this embodiment.

The operation in this embodiment is explained below. The laser light emitted from semiconductor laser 7 is projected through collimator lens 9, beam splitter lens 12, and condenser lens 6 to magneto optical disk 1. Condenser lens 6 moves under control by actuator 5 in the focusing direction and the tracking direction to focus the laser light successively on the magneto-optical disk, and tracks along the guiding groove formed on the magneto-optical medium.

The laser light reflected by magneto-optical disk 1 is deflected by beam splitter 12 toward polarizing beam splitter 15, and collected to sensor 17 through $\lambda/2$ plate 14 and polarizing beam splitter 15 by condenser lens 16 in accordance with to the polarization polarity of the magneto-optical disk, respectively. The output of photosensor 17 is introduced to differential amplification circuit 18 and summation amplification circuit 19 to be differentially amplified or summation amplified and is output as magneto-optical signals and summation signals.

The magneto-optical signal is introduced to binarization circuit 22, and the summation signal is introduced to binarization circuit 20. Binarization circuit 20 binarizes reproduction signals from the clock pits formed on magneto-optical disk 1 in comparison of analog signals with a slice level.

From the binarized signals, a recordation clock signal and a reproduction clock signal are produced by clock formation phase adjustment circuit 21. The clock-formation-phase adjustment circuit 21 further serves to adjust the phases of the recordation clock signal, the reproduction clock signal, and the reproducing magnetic field driving clock signal, as necessary.

Binarization circuit 22 also binarizes magneto-optical signals by comparison of the analog signals with a slice level. The binarized signal is introduced to D-flip-flop (D-FF) 23. The D-flip-flop 23 receives the binarized magneto-optical signal at its D-input terminal, and the reproduction clock signal produced by the aforementioned clock formation-phase adjustment circuit 21 at its CK input terminal, to produce a reproduction signal sequence.

In recordation, semiconductor laser 7 is driven by LD driver 25 so as to emit recordation laser power as DC light, and simultaneously magnetic head 26 is driven by magnetic field modulation driver 27 serving as a magnetic field modulation driver to generate magnetic fields of different polarity in accordance with the recordation signal. In reproduction, semiconductor laser 7 is driven by LD driver 25 to emit recordation laser power as DC light, and simultaneously magnetic head 26 is driven by magnetic field modulation driver 27 so as to generate an alternating magnetic field in accordance with a reproduction clock signal. Magnetic head 26 is interlocked with the optical head and, on recordation or reproduction moves in the radius direction of the magneto-optical disk so as to write or read information by application of a magnetic field to the laser irradiated spot on magneto-optical disk 3 successively.

The operation in this embodiment is described in detail by reference to FIGS. 5A to 5I. FIGS. 5A to 5I are shown in the same linear density as that in FIGS. 3A to 3H. FIG. 5A shows a channel clock signal for 1-7 modulation detected and generated from clock pits on magneto-optical medium 3. FIG. 5B shows 1-7 NRZI record data sequence output from controller 24. FIG. 5C shows recordation signals produced by record sequence production circuit 28. FIG. 5D shows a record mark sequence recorded on optical disk 1. FIG. 5E shows heated regions at clock timings. FIG. 5F shows an alternating reproducing magnetic field controlled by controller 24. FIG. 5G shows reproduction signals corresponding to the record mark sequence of FIG. 5D. FIG. 5H shows a reproduction clock signal. FIG. 5I shows reproduced binary signals corresponding to the 1-7 NRZI record sequence shown in FIG. 5B.

In this embodiment, the heated region shown in FIG. 5E signifies a region heated to the temperature necessary for transfer of the magnetic domain in the memory layer to the readout layer.

In this embodiment NRZI recordation of 1-7 modulation is employed, so that the minimum code reversal interval $n_{min}$ is 2, and therefore the minimum record mark length and the minimum no-record mark length, $n_{min}T$, are 2T, respectively. In this embodiment, as an example, the record mark is modified so as to be shorter by 1.5T than the case of the normal (standard) code reversal interval, and the no-record mark is modified so as to be longer by 1.5T. The recordation signal in a pattern shown in FIG. 5C is produced and recorded by means of record sequence formation circuit 28 shown in FIG. 4. More specifically, when the code reversal interval for the recordation code is represented by n and the length of the one channel is represented by T, the aforementioned record mark length nT is changed to (n−1.5)T, and the no-record mark length nT is changed to (n+1.5)T.

Accordingly, the recordation signal is as shown in FIG. 5C, and from the record data shown in FIG. 5B a pattern having a pulse width reduced by 1.5T is produced and recorded by record sequence formation circuit 28.

The recordation is conducted by a magnetic field modulation recordation system. With this system, simultaneously with start of recordation, recordation DC laser power, and a modulating magnetic field corresponding to the recordation signal shown in FIG. 5C are applied, and the record mark sequence shown in FIG. 5D is formed in the memory layer during the cooling step of magneto-optical disk 1. In FIG. 5D, the shadowed portions indicate record marks which cause transfer of magnetic domains to the readout layer, and white blank portions indicate no-record marks which do not cause transfer of the magnetic domains to the readout layer.

On the other hand, during reproduction, the summation signals obtained by addition amplification circuit 19 are binarized by binarization circuit 20 to form and detect the reproduction clock signal from magneto-optical disk 1 by means of clock production-phase adjustment circuit 21.

The reproducing magnetic field is applied in a phase relation such that the time of the maximum or center of the applied magnetic field reverse to the domain enlargement direction of the applied alternating magnetic field is positioned at the center of the record mark of $(n_{min}-1.5)T$.

The principle of the output of the reproduction signal is explained below. In timing (1) and timing (2) of the reproduction clock signal, regions (1) and (2) of the same code are heated, and a recorded domain is present in heated regions (1) and (2) (shadowed portion in FIG. 5D). Thereby the magnetization in the memory layer of magneto-optical disk 1 is transferred to the readout layer, and is enlarged instantaneously on application of a reproducing magnetic field in a domain enlargement direction.

On the other hand, the magnetization is erased instantaneously on application of the reversed reproduction magnetic field in a domain-erasing direction. Here, the "+" direction of the domain denotes the direction of domain enlargement, and the "−" direction of the domain denotes the domain erasure direction. Thereby, the reproduction signal changes sharply in synchronization with the applied reproducing magnetic field.

In timing (3) and timing (4) of the reproduction clock signal, regions (3) and (4) of the same code are heated. In these regions, no recorded domain is present since the pattern of the recorded domain is corrected so as to be shorter than the mark length of the recorded domain. As a result, transfer and enlargement of the magnetic domain are not generated.

Further, the heated region for the no-record mark satisfies the condition $(k+1)T > L_{thermal}$ (where $L_{thermal}$ is the length of the heated region in the line density direction) so as not to contain the recorded domain. Thereby, the linear density of the record can be raised by (k+1)-fold: approximately 2.5-fold in this embodiment.

Accordingly, within the range of the linear density of the record satisfying the above formula, the magnetic domain is not transferred from the memory layer to the readout layer, the domain is not enlarged on application of a reproducing magnetic field as shown in FIG. 5F, so that no error is caused in the reproduction signal shown in FIG. 5G. Thereby, in reproduction of the no-record mark, domain transfer and domain enlargement are prevented, enabling recordation and reproduction in a higher record density.

On the same principle, the reproduction signal is as shown in FIG. 5G. The reproduction signal shown in FIG. 5G is binarized by binarization circuit 22, and the binarization signal is treated, for example, by D flip-flop (D-FF) 23 to obtain the reproducing binary signal as the reproduction signal sequence as shown in FIG. 5I in correspondence with the recorded data shown FIG. 5B.

For the generation of a reproduced binary signal as shown in FIG. 5I from the reproduction signal shown in FIG. 5G, the technique is not limited to the use of D flip-flop 23, but the signal may be formed by sampling the reproduction signal shown in FIG. 5G directly with the reproduction clock signal shown in FIG. 5H, converting it by A/D conversion, and binarizing the digital values to form the reproduction binary signal.

(Embodiment 2)

NRZI modulation recordation is explained in this embodiment, taking as an example a case where the minimum interval $n_{min}$ of the recordation code reversal is odd in number. Incidentally, in the NRZI modulation recordation, $n_{min}$ is 1. In this embodiment, the constitution of the magneto-optical recording reproducing apparatus is the same as that in embodiment 1.

The operation of this embodiment is described with reference to FIGS. 6A to 6I. FIGS. 6A to 6I are shown with the same linear density as in FIGS. 3A to 3H. FIG. 6A shows a channel clock signal in NRZI modulation formed by detection of clock pits on magneto-optical medium 3. FIG. 6B shows a NRZI record data sequence output from controller 24. FIGS. 6C to 6I show signals respectively corresponding to the signals in FIGS. 5C to 5I. In this embodiment, the pattern shown in FIG. 6B is recorded as the NRZI modulation record data.

In this embodiment, since NRZI modulation recordation is conducted, so that the minimum code reversal interval $n_{min}$ is 1, and therefore the minimum record mark length and the minimum no-record mark length, $n_{min}T$, are 1T respectively in the record data shown in FIG. 6B. Therefore, the correction of k=1 or more is impracticable. In this embodiment, k is set to k=0.6, and the record mark length is corrected to be shorter by 0.6T, and the no-record mark length is corrected to be longer correspondingly in recordation.

Accordingly, the recordation signal is as shown in FIG. 6C. The pattern having a pulse width smaller than that of recorded data in FIG. 6B by about 0.6T is produced and recorded by record sequence-producing circuit 28.

During recordation, a magnetic field modulation recordation system is employed similarly as in Embodiment 1. During recordation, recording DC laser power, and a modulating magnetic field corresponding to a recordation signal (FIG. 6C) are applied, and the recorded marks are formed during the cooling of the magneto-optical disk 1 as shown in FIG. 6D. In FIG. 6D, the shadowed portions show the recorded domains which can be transferred to the readout layer, and the white-blank portions show no-record marks which will not cause magnetic domain transfer to the readout layer.

On the other hand, during reproduction, the summation signal obtained from addition-multiplication circuit 19 is binarized by binarization circuit 20, and a reproduction clock signal is detected and formed from clock pits on magneto-optical disk 1 by means of clock formation-phase adjustment circuit 21. This clock formation-phase adjustment circuit 21 serves to adjust as necessary the phases of the recordation clock, the reproduction clock, and reproducing magnetic field driving clock.

The reproducing magnetic field is applied in a phase relation such that the time of the maximum of the applied magnetic field reverse to the domain enlargement direction of the applied alternating magnetic field, or the center of the alternating magnetic field application time is positioned at the center of the record mark of $(n_{min}-0.6)T$.

The principle of the output of the reproduction signal is explained below. In timing (2) and timing (4) of the reproduction clock, regions (2) and (4) of the same code are heated, and a recorded domain is present in heated regions (2) and (4) (shadowed portion in FIG. 6D). Thereby the magnetization in the memory layer of magneto-optical disk 1 is transferred to the readout layer, and is enlarged instantaneously on application of a reproducing magnetic field in a domain enlargement direction.

On the other hand, the magnetization is erased instantaneously on application of the reversed reproduction magnetic field in a domain-erasing direction. Here, the "+" direction of the domain denotes the direction of domain enlargement, and the "−" direction of the domain denotes the domain erasure direction. Thereby, the reproduction signal changes sharply in synchronization with the applied reproducing magnetic field.

In timing (1) and timing (3) of the reproduction clock, regions (1) and (3) of the same code are heated. In these regions, no recorded domain is present since the pattern of the recorded domain is corrected to be shorter than the mark length of the recorded domain. As a result, transfer and enlargement of the magnetic domain are not generated.

Further, the heated region for the no-record mark satisfies the condition $(k+1)T > L_{thermal}$ (where $L_{thermal}$ is the length of the heated region in the line density direction) so as not to contain the recorded domain. Thereby, the linear density of the record can be raised by (k+1)-fold: approximately (1+0.6)-fold in this embodiment.

Accordingly, within the range of the linear recordation density satisfying the above formula, the magnetic domain is not transferred from the memory layer to the readout layer, and the domain is not enlarged on application of reproducing magnetic field as shown in FIG. 6F, so that no error is caused in the reproduction signal shown in FIG. 6G. Thereby, in reproduction of the no-record mark, domain transfer and domain enlargement are prevented, enabling recordation and reproduction in a higher record density.

On the same principle, the reproduction signal is as shown in FIG. 6G. The reproduction signal shown in FIG. 6G is binarized by binarization circuit 22, and the binarized signal is treated, for example, by D-flip-flop (D-FF) 23 to obtain a reproducing binary signal as the reproduction signal sequence as shown in FIG. 6I in correspondence with the recorded data shown FIG. 6B.

For the generation of a reproduced binary signal as shown in FIG. 6I from the reproduction signal shown in FIG. 6G, the technique is not limited to the use of D-flip-flop 23, but the signal may be generated by sampling the reproduction signal shown in FIG. 6G directly with the reproduction clock signal shown in FIG. 6H, converting it by A/D conversion, and binarizing the digital values to form the reproduction binary signal.

Embodiments 1 and 2 describe recordation by magnetic field modulation recordation with DC recordation light, and reproduction by use of DC light. Otherwise, recordation may be conducted by pulse-assisted magnetic field modulation recordation in which the intensity of the recording light is modulated in a pulse state, and reproduction may be conducted by pulse light reproduction in which intensity of the reproduction light is modified.

In Embodiments 1 and 2, an optical disk 1 is employed. However, the magneto-optical medium is not limited thereto, and may be a magneto-optical card, a magneto-optical tape, or the like.

What is claimed is:

1. A magneto-optical recording-reproducing process for reproducing a record mark of a record mark sequence formed on a magneto-optical medium having a memory layer and a readout layer where a record mark includes a magnetic domain in the memory layer, said process comprising the steps of:

recording a record mark sequence in the memory layer, where a length of a record mark is made shorter than that of an interval of code reversal, and a length of a no-record mark is made correspondingly longer;

projecting a light beam onto the magneto-optical medium, so as to form a heated region in the magneto-optical medium, and scanning the light beam relative to the magneto-optical medium, so as to scan the heated region in a scanning direction in the magneto-optical medium, whereby, in the scanning heated region, the magnetic domain of a record mark in the memory layer is transferred and enlarged into the readout layer in an enlarging direction; and detecting the enlarging magnetic domain in the readout layer as a record mark for reproducing the record mark sequence.

2. The magneto-optical recording-reproducing process according to claim 1, wherein a record mark of a length nT is made shorter to a length $$(n-k)T$$

and a no-record mark of a length nT is made longer to a length $$(n+k)T$$

where n is the code reversal interval of the record code, T is one channel length, and k is a real number satisfying the relation:

$$0 < k < n_{min}$$

where $n_{min}$ is the minimum code reversal interval.

3. The magneto-optical recording-reproducing process according to claim 2, further comprising:

applying an alternating magnetic field to the record mark sequence to enlarge or erase magnetic domains in the readout layer when reproducing the record mark sequence, where the alternating magnetic field has a frequency of at least one cycle for one channel length, synchronized with the shortened record mark, and where, when the minimum code reversal interval $n_{min}$ is even in number, the alternating magnetic field is applied in a phase relation such that the center of the shortened record mark of $(n_{min}-k)T$ is positioned at the maximum of the applied alternating magnetic field reverse to the direction of the magnetic field in which the magnetic domain is enlarged by the applied alternating magnetic field, and when the minimum code reversal interval $n_{min}$ is odd in number, the alternating magnetic field is applied in a phase relation such that the center of the shortened record mark of $(n_{min}-k)T$ is positioned at the maximum of the applied alternating magnetic field in the direction of enlarging of the magnetic domain; and obtaining a reproduction code series of the reproduction signal by sampling the reproduction signal at the phase timing of the maximum of the alternating magnetic field applied in the direction of the magnetic field in which the magnetic domain is enlarged by the applied alternating magnetic field.

4. The magneto-optical recording-reproducing process according to claim 1 or 2, wherein the heated region or a recordation density is set in the relation:

$$(k+1)T > L_{thermal}$$

where $L_{thermal}$ is the length of a heated region in the scanning direction of the light beam for heating the heated region up to the temperature necessary for transferring the magnetic domain in the memory layer to the readout layer; T is the length of one channel; and k is a real number satisfying the relation $0 < k < n_{min}$, where $n_{min}$ is the minimum code reversal interval.

5. The magneto-optical recording-reproducing process according to claim 4, further comprising:

applying an alternating magnetic field to the record mark sequence to enlarge or erase magnetic domains in the readout layer when reproducing the record mark sequence, where the alternating magnetic field has a frequency of at least one cycle for one channel length, synchronized with the shortened record mark, and where, when the minimum code reversal interval $n_{min}$ is even in number, the alternating magnetic field is applied in a phase relation such that the center of the shortened record mark of $(n_{min}-k)T$ is positioned at the maximum of the applied alternating magnetic field reverse to the direction of the magnetic field in which the magnetic domain is enlarged by the applied alternating magnetic field, and when the minimum code reversal interval $n_{min}$ is odd in number, the alternating magnetic field is applied in a phase relation such that the center of the corrected record mark of $(n_{min}-k)T$ is positioned at the maximum of the applied alternating magnetic field in the direction of enlarging of the magnetic domain; and obtaining a reproduction code series of the reproduction signal by sampling the reproduction signal at the phase timing of the maximum of the alternating magnetic field applied in the direction of the magnetic field in which the magnetic domain is enlarged by the applied alternating magnetic field.

6. A magneto-optical recording-reproducing apparatus for use with a magneto-optical recording medium having a memory layer and a readout layer, said apparatus comprising:

means for projecting a light beam onto the magneto-optical medium, so as to form a heated region in the magneto-optical medium;

means for transferring a magnetic domain in the memory layer at the heated region into the readout layer and enlarging the transferred magnetic domain in the readout layer:

correction means for correcting a length of a record mark by making it shorter than that of an interval of code reversal, and for correcting a length of a no-record mark by making it correspondingly longer;

recordation means for recording in the memory layer a record mark corrected by the correction means; and reproduction means for reproducing a record mark sequence by detection of enlargement of the magnetic domain of a corrected record mark in the readout layer.

7. The magneto-optical recording-reproducing apparatus according to claim 6, wherein a record mark of a length nT is corrected to have a length $$(n-k)T$$

and no-record mark of a length nT is corrected to have a length $$(n+k)T$$

where n is code reversal interval of the record code, T is one channel length, and k is a real number satisfying the relation:

$$0<k<n_{min}$$

where $n_{min}$ is the minimum code reversal interval.

8. The magneto-optical recording-reproducing apparatus according to claim 7, wherein the reproduction means reproduces the record mark sequence by applying an alternating magnetic field to the record mark sequence to enlarge or erase the magnetic domains, where the alternating magnetic field has a frequency of at least one cycle for one channel length, synchronized with the corrected record mark, where, when the minimum code reversal interval $n_{min}$ is even in number, the alternating magnetic field is applied in a phase relation such that the center of the corrected record mark of $(n_{min}-k)T$ is positioned at the maximum of the applied alternating magnetic field reverse to the direction of the magnetic field in which the magnetic domain is enlarged by the applied alternating magnetic field, and when the minimum code reversal interval $n_{min}$ is odd in number, the alternating magnetic field is applied in a phase relation such that the center of the corrected record mark of $(n_{min}-k)T$ is positioned at the maximum of the applied alternating magnetic field in the direction of enlarging of the magnetic domain, and where a reproduction code series of the reproduction signal is obtained by sampling the reproduction signal at the phase timing of the maximum of the alternating magnetic field applied in the direction of the magnetic field in which the magnetic domain is enlarged by the applied alternating magnetic field.

9. The magneto-optical recording-reproducing apparatus according to claim 6 or 7, wherein the heated region or a recordation density is set in the relation:

$$(k+1)T>L_{thermal}$$

where $L_{thermal}$ is the length of a heated region in the scanning direction of the light beam for heating the heated region up to the temperature necessary for transferring the magnetic domain in the memory layer to the readout layer; T is the length of one channel; and k is a real number satisfying the relation of $0<k<n_{min}$, where $n_{min}$ is the minimum code reversal interval.

10. The magneto-optical recording-reproducing apparatus according to claim 9, wherein the reproduction means reproduces the record mark sequence by applying an alternating magnetic field to the record mark sequence to enlarge or erase magnetic domains in the readout layer, where the alternating magnetic field has a frequency of at least one cycle for one channel length, synchronized with the corrected record mark, where, when the minimum code reversal interval $n_{min}$ is even in number, the alternating magnetic field is applied in a phase relation such that the center of the corrected record mark of $(n_{min}-k)T$ is positioned at the maximum of the applied alternating magnetic field reverse to the direction of the magnetic field in which the magnetic domain is enlarged by the applied alternating magnetic field, and when the minimum code reversal interval $n_{min}$ is odd in number, the alternating magnetic field is applied in a phase relation such that the center of the corrected record mark of $(n_{min}-k)T$ is positioned at the maximum of the applied alternating magnetic field in the direction of enlarging of the magnetic domain, and where a reproduction code series of the reproduction signal is obtained by sampling the reproduction signal at the phase timing of the maximum of the alternating magnetic field applied in the direction of the magnetic field in which the magnetic domain is enlarged by the applied alternating magnetic field.

11. The magneto-optical recording-reproducing process according to claim 2, further comprising:

applying an alternating magnetic field to the record mark sequence to enlarge or erase magnetic domains in the readout layer when reproducing the record mark sequence, where the alternating magnetic field has a frequency of at least one cycle for one channel length, synchronized with the shortened record mark, where, when the minimum code reversal interval $n_{min}$ is even in number, the alternating magnetic field is applied in a phase relation such that the center of the shortened record mark of $(n_{min}-k)T$ is positioned at the center of the time of application of the applied alternating magnetic field, and when the minimum code reversal interval $n_{min}$ is odd in number, the alternating magnetic field is applied in a phase relation such that the center of the shortened record mark of $(n_{min}-k)T$ is positioned at the center of the time of application of the applied alternating magnetic field; and obtaining a reproduction code series of the reproduction signal by sampling the reproduction signal at the phase timing of the center of the time of the alternating magnetic field application.

12. The magneto-optical recording-reproducing process according to claim 4, further comprising:

applying an alternating magnetic field to the record mark sequence to enlarge or erase magnetic domains in the readout layer when reproducing the record mark sequence, where the alternating magnetic field has a frequency of at least one cycle for one channel length, synchronized with the shortened record mark, and where, when the minimum code reversal interval $n_{min}$ is even in number, the alternating magnetic field is applied in a phase relation such that the center of the shortened record mark of $(n_{min}-k)T$ is positioned at the center of the time of application of the applied alternating magnetic field, and when the minimum code reversal interval $n_{min}$ is odd in number, the alternating magnetic field is applied in a phase relation such that the center of the shortened record mark of $(n_{min}-k)T$ is positioned at the center of the time of application of the applied alternating magnetic field; and obtaining a reproduction code series of the reproduction signal by sampling the reproduction signal at the phase timing of the center of the time of the alternating magnetic field application.

13. The magneto-optical recording-reproducing apparatus according to claim 7, wherein said reproducing means reproduces a record mark sequence by applying an alternating magnetic field to the record mark sequence to enlarge or erase magnetic domains in the readout layer, where the alternating magnetic field has a frequency of at least one cycle for one channel length, synchronized with the corrected record mark, where, when the minimum code reversal interval $n_{min}$ is even in number, the alternating magnetic field is applied in a phase relation such that the center of the corrected record mark of $(n_{min}-k)T$ is positioned at the center of the time of application of the applied alternating magnetic field, and when the minimum code reversal interval $n_{min}$ is odd in number, the alternating magnetic field is applied in a phase relation such that the center of the corrected record mark of $(n_{min}-k)T$ is positioned at the center of the time of application of the applied alternating magnetic field, and where a reproduction code series of the reproduction signal is obtained by sampling the reproduction signal at the phase timing of the center of the time of the alternating magnetic field application.

14. The magneto-optical recording-reproducing process according to claim 9, wherein said reproducing means reproduces a record mark sequence by applying an alternating magnetic field to the record mark sequence to enlarge or erase magnetic domains in the readout layer, where the alternating magnetic field has a frequency of at least one cycle for one channel length, synchronized with the corrected record mark, where, when the minimum code reversal interval $n_{min}$ is even in number, the alternating magnetic field is applied in a phase relation such that the center of the corrected record mark of $(n_{min}-k)T$ is positioned at the center of the time of application of the applied alternating magnetic field, and when the minimum code reversal interval $n_{min}$ is odd in number, the alternating magnetic field is applied in a phase relation such that the center of the corrected record mark of $(n_{min}-k)T$ is positioned at the center of the time of application of the applied alternating magnetic field, and where a reproduction code series of the reproduction signal is obtained by sampling the reproduction signal at the phase timing of the center of the time of the alternating magnetic field application.

* * * * *

UNITED STATES PATENT AND TRADEMARK OFFICE
CERTIFICATE OF CORRECTION

Figure 1:
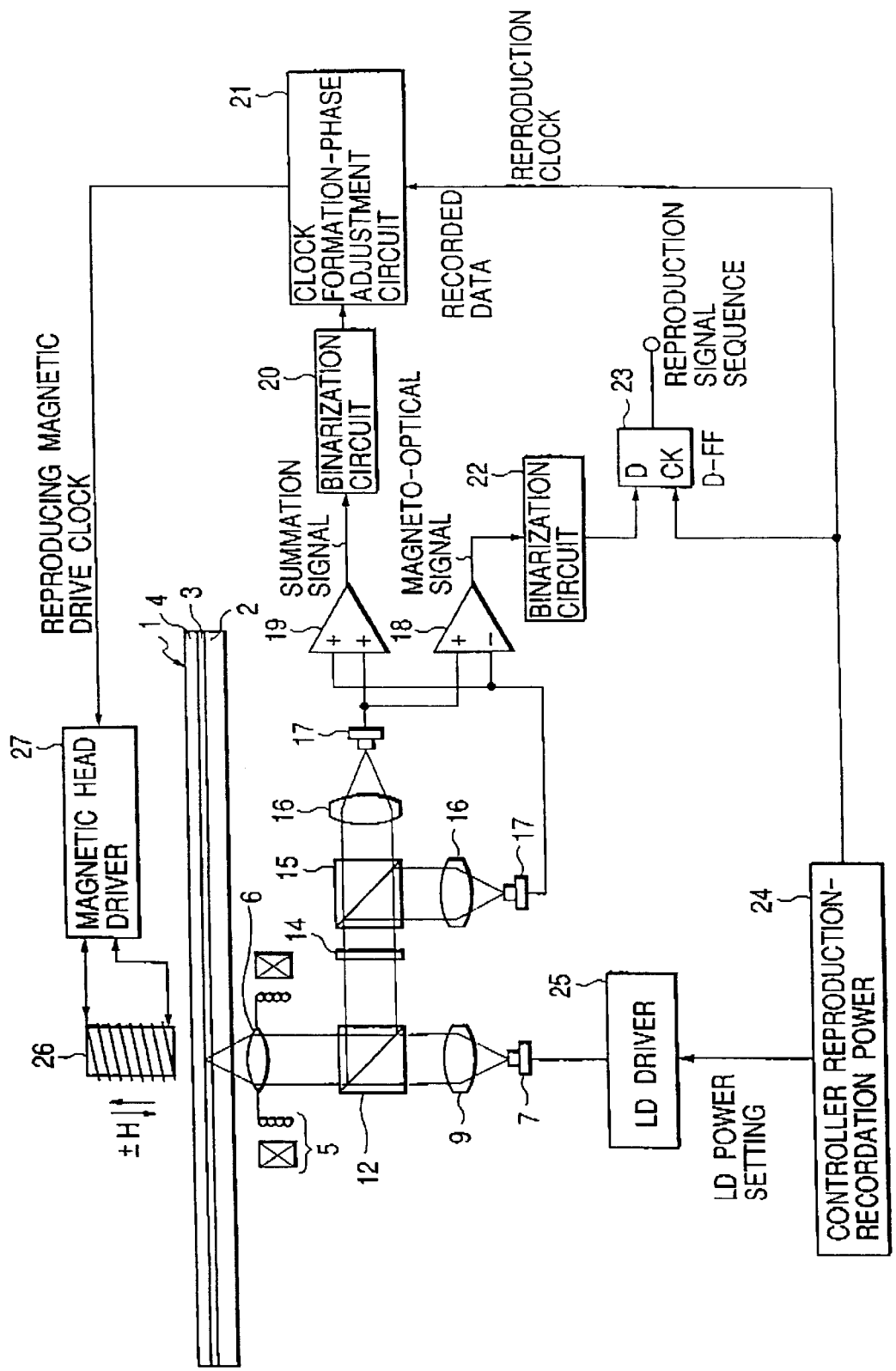
FIG. 1 illustrates schematically an example of a conventional magneto-optical recording-reproducing apparatus.
Figure 2:
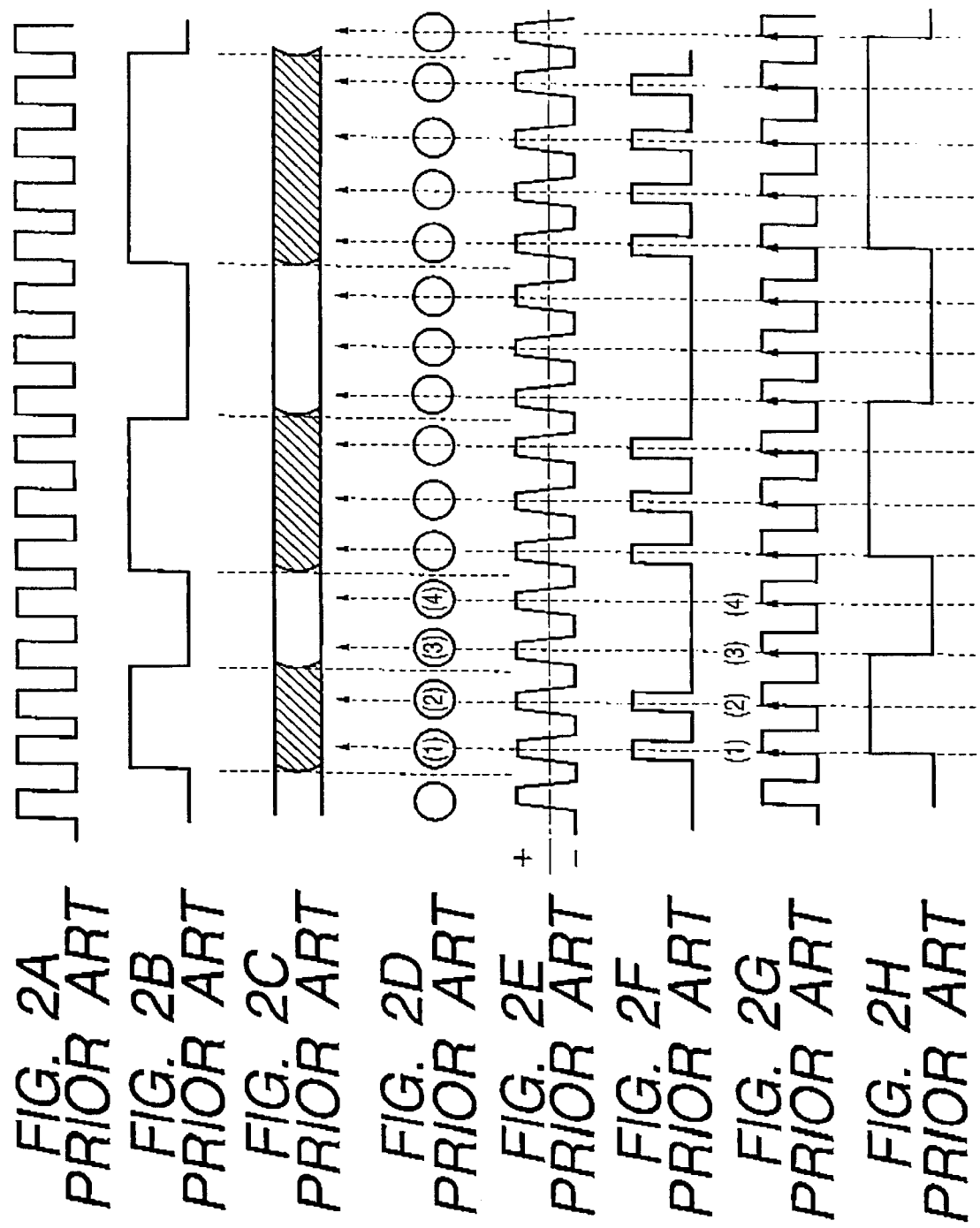
FIGS. 2A, 2B, 2C, 2D, 2E, 2F, 2G, and 2H are timing charts for a conventional magneto-optical recording-reproducing process.
Figure 3:
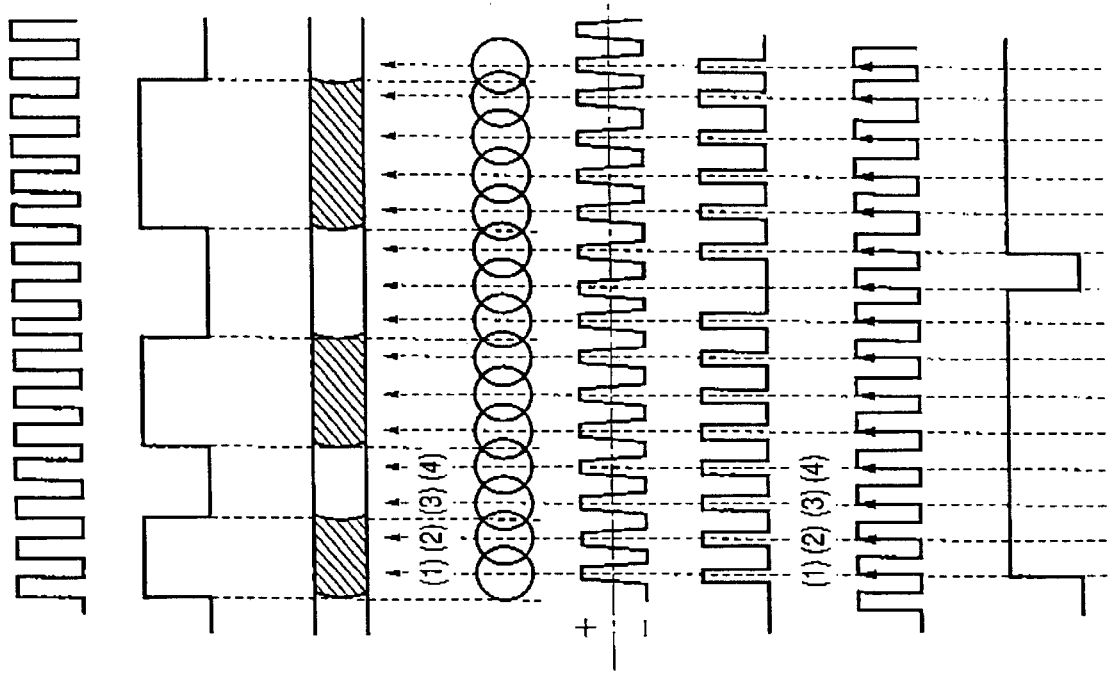
FIGS. 3A, 3B, 3C, 3D, 3E, 3F, 3G, and 3H are timing charts for a conventional magneto-optical recording-reproducing process with an increased linear recordation density.

PATENT NO. : 6,314,061 B1
DATED : November 6, 2001
INVENTOR(S) : Yasuyuki Miyaoka It is certified that error appears in the above-identified patent and that said Letters Patent is hereby corrected as shown below:

Column 2,
Line 25, "FIG. 2C." -- closes up right margin --.
Line 26, "FIG. 2G" -- closes up left margin --.

Column 6,
Line 26, "of" should be deleted.
Line 49, "to" should be deleted.

Column 10,
Line 65, "layer" ($2^{nd}$ occurrence) should read -- layer, --.

Signed and Sealed this

Twenty-first Day of May, 2002

*Attest:*

*Attesting Officer*

JAMES E. ROGAN
*Director of the United States Patent and Trademark Office*